United States Patent Office 3,847,988
Patented Nov. 12, 1974

3,847,988
SUBSTITUTED IMIDATES
Elijah H. Gold, West Orange, N.J., assignor to Schering Corporation, Bloomfield, N.J.
No Drawing. Continuation-in-part of abandoned application Ser. No. 211,780, Dec. 23, 1971. This application June 20, 1973, Ser. No. 371,800
Int. Cl. C07c 119/00
U.S. Cl. 260—566 D                4 Claims

ABSTRACT OF THE DISCLOSURE

This application relates to certain substituted imidates which are effective anti-androgenic agents. These N-aryl imidates are prepared by subjecting the appropriate N-arylamidohalide to alcoholysis with the appropriate alcohol.

---

This application is a continuation-in-part application of my co-pending application Ser. No. 211,780 filed Dec. 23, 1971, now abandoned.

The N-arylimidates of the present invention are those of the general formula I

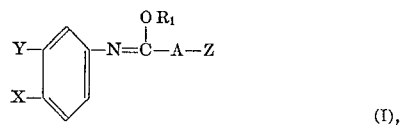

(I), and the pharmaceutically acceptable acid addition salts thereof, in which formula $R_1$ represents lower alkyl, lower cycloalkyl, aralkyl or aryl, X represents nitro, trifluoromethyl or halogen, Y represents hydrogen, halogen, nitro, lower alkyl, lower alkoxy, lower alkanoyloxy, lower alkanoyl, polyfluorolower alkoxy, polyfluorolower alkyl or trifluoromethylthio, A represents

wherein $R_2$ and $R_3$ independently represent Z-substituted-alkyl in which the alkyl moiety is straight or branched-chain and has up to 5 carbon atoms, or $R_2$ and $R_3$ together with the carbon atom to which they are attached represent Z-substituted-cycloalkyl in which the cycloalkyl moiety has up to 5 carbon atoms, and Z represents hydrogen, halogen or a free, etherified or esterified hydroxy group, with the proviso that when X and Y are both chloro, or when X is chloro and Y is methyl, then $R_1$ is alkyl cycloalkyl or aralkyl.

Unless otherwise stated, the term "lower" as used herein in conjunction with alkyl, alkoxy, alkanoyl cycloalkyl and alkanoyloxy means that such groups have up to 6 carbon atoms. The term "polyfluoro" as applied to a particular grouping means that at least two of the hydrogen atoms of that grouping are replaced by fluorine and includes the cases where that grouping is partially fluorinated or is a per-fluoro grouping.

In formula I, A preferably represents the grouping

in which $R_2$ and $R_3$ independently represent Z-substituted-alkyl with the alkyl moiety being straight or branched-chain and having up to 5 carbon atoms. Where each Z is hydrogen, then the grouping —A—Z may typically be 1,2-dimethylpropyl, 1-methylpropyl or, preferably, isopropyl. Where one of the groups Z represents halogen or a free, etherified or esterified hydroxy group and the others hydrogen, then that one group Z is suitably bonded to a tertiary carbon atom and the grouping —A—Z may typically be a 1-hydroxy isopropyl group. In the case where Z is an etherified or esterified hydroxy group, then such groups may suitably be represented by

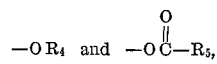

where $R_4$ and $R_5$ are hydrocarbyl radicals, and will include lower alkoxy and lower alkanoyloxy groups.

Of the groups which $R_1$ may represent, aralkyl is typically an aryl-lower alkyl group, in particular a benzyl group, and aryl is typically a group containing up to about 12 carbon atoms and in particular may be a phenyl group. Preferably, however, $R_1$ is a lower alkyl group. Of X and Y particular combinations are X being iodo, bromo, chloro or, in particular, nitro and Y being trifluoromethyl, and also X being nitro with Y being bromo or chloro.

The term pharmaceutically acceptable acid addition salts is well known in the art and embraces salts derived from both organic and inorganic acids.

As specific examples of compounds of the general formula I there may be mentioned: ethyl N-(4-nitro-3-trifluoromethylphenyl)-cyclopropylcarbimidate; ethyl N-(4 - nitro - 3-trifluoromethylphenyl)-isobutyrimidate; ethyl N-(4-iodo-3-trifluoromethylphenyl)-isobutyrimidate; ethyl N - (4' - nitro - 3' - trifluoromethylphenyl)-2,3-dimethylbutyrimidate; ethyl N-(4'-nitro-3'-trifluoromethylphenyl)-2 - methylbutyrimidate; ethyl N - (4 - bromo-3-trifluoromethylphenyl)-isobutyrimidate; ethyl N-(4-nitrophenyl)-isobutyrimidate; ethyl N - (4 - chloro - 3 - trifluoromethylphenyl) - isobutyrimidate; ethyl N - (3 - bromo - 4 - nitrophenyl) - isobutyrimidate; ethyl N - (3 - chloro - 4 - nitrophenyl)-isobutyrimidate.

The compounds of the general formula I may be prepared by methods known for the preparation of previously described compounds having similar structure.

The following methods will now be described:

A: In a preferred method, an N-arylimidohalide of the general formula II

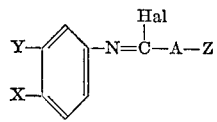

(II)

is subjected to alcoholysis by reacting the compound with a hydroxy compound of the general formula III $$R_1OH \quad (III),$$

or, more preferably, with a salt thereof, in which formulae X, Y, A and $R_1$ are as defined for formula I and Z is hydrogen, halogen or an etherified hydroxy group. The salt of the hydroxy compound is suitably an alkali metal salt such as the sodium or potassium salt, and the halogen atom in the compound of the formula II is preferably chlorine or bromine.

The conditions under which the reaction is effected are not considered to be critical. Suitably, the reaction is effected in an inert solvent such as diethyl ether, toluene, chloroform or, conveniently, by using the compound $R_1OH$ as the reaction medium. The reaction proceeds smoothly at room temperature and, typically, equimolar amounts of the reactants are employed. The reaction time will be dependent upon such parameters as the specific reactants used, temperature, etc., but for guidance it may be said that reaction at room temperature of N-(4-nitro-3-trifluoromethyl-phenyl)-isobutyrcholorimidate with sodium ethoxide was effectively complete in about 1.5 hours and that, in general, a reaction time of 1 to 3 hours would therefore be indicated. To isolate the desired product, the reaction mixture may be quenched with water, extracted with a water-immiscible solvent and, following recovery from the solvent, purified using standard techniques such as distillation or recrystallization.

The N-arylhaloimidate starting materials can readily be prepared from the corresponding anilides IV by treatment with phosphorus pentachloride or phosphorus pentabromide in an inert solvent such as toluene or benzene under anhydrous conditions so that hydrolysis of the N-arylhaloimidate product is avoided. This is schematically represented by:

$$Y\text{-}\underset{X}{\bigcirc}\text{-}\underset{H}{\overset{|}{N}}\text{-}\overset{O}{\overset{\|}{C}}\text{-}A\text{-}Z \quad \xrightarrow{PCl_5 \atop (PBr_5)} \quad Y\text{-}\underset{X}{\bigcirc}\text{-}N{=}\underset{Cl(Br)}{\overset{|}{C}}\text{-}A\text{-}Z$$

(IV)                     (II)

In turn, the anilide starting materials of the formula IV can be prepared by condensing an appropriate X,Y-substituted aniline V and acyl halide VI, such as by heating the reactants in an inert medium and in the presence of an acid acceptor such as a tertiary organic amine or a basic inorganic salt as represented by the following scheme:

$$Y\text{-}\underset{X}{\bigcirc}\text{-}NH_2 + \text{Halide} \cdot CO \cdot A\text{-}Z \xrightarrow{\text{acid acceptor}} \text{(IV)}$$

(V)         (VI)

B: Another method for the preparation of the compounds of the general formula I comprises condensing a thioanilide of the general formula VII $$Y\text{-}\underset{X}{\bigcirc}\text{-}NH\text{-}\overset{S}{\overset{\|}{C}}\text{-}A\text{-}Z$$

(VII), with a haloformate ester of the general formula VIII $$R_1O\overset{O}{\overset{\|}{C}}\text{-Hal.} \quad \text{(VIII)}$$

in which formulae X, Y, Z, A and $R_1$ are as defined for formula I and Hal represents halogen, preferably chlorine.

Typically, the reactants are heated together in equimolar quantities until the thioanilide starting material is consumed, and the desired product is then isolated using known techniques. The thioanilide starting material may be obtained from the corresponding anilide by reaction with $P_2S_5$, or by reacting an X,Y-substituted aniline with a thio-compound of the formula $$Z\text{-}A\text{-}\overset{S}{\overset{\|}{C}}\text{-}SH$$

or with an ester thereof, wherein X, Y, A and Z are as defined above.

C: The compounds of the general formula I in which X is nitro may also be prepared by condensing a halobenzene of the general formula IX $$Y\text{-}\underset{X}{\bigcirc}\text{-Hal.}$$

(IX), with an imidic acid ester of the general formula X $$HN{=}\underset{|}{\overset{OR_1}{C}}\text{-}A\text{-}Z \quad \text{(X)},$$

in which formulae Y, Z, A and $R_1$ are as defined in formula I, X represents nitro and Hal. represents halogen, preferably chlorine. Typically, the reaction is carried out in an inert solvent such as dimethylsulfoxide and in the presence of a basic catalyst such as potassium carbonate.

D: Another method for the preparation of the compounds of general formula I comprises condensing an aniline derivative of the general formula V $$Y\text{-}\underset{X}{\bigcirc}\text{-}NH_2$$

(V), with an orthoester of the general formula XI $$(R_1O)_3\text{-}C\text{-}A\text{-}Z \quad \text{(XI)},$$

in which formulae X, Y, A and $R_1$ are as defined for formula I and Z represents hydrogen or halogen, the ratio of orthoester to aniline derivative employed in the reaction being, preferably, not substantially greater than 1:1. Suitably, the reaction is carried out by heating an equimolar mixture of the reactants either in the absence of a solvent, or, if desired, in the presence of a substantially inert solvent.

While a small amount of an acid catalyst may also be employed, the reaction is preferably carried out in the absence of a catalyst. A suitable temperature range which may be used, can be exemplified by the case of employing 4-nitro - 3 - trifluoromethyl-aniline and triethylorthoisobutyrate as reactants where the reaction was conveniently carried out at a temperature of 150–155° C. A similar temperature range may be employed for other combinations of reactants. To avoid undue conversion of the N-arylimidate product into the corresponding anilide, the use of a ratio of orthoester to aniline starting material in excess of about 1:1, especially 1.5:1 and above, is to be avoided particularly in combination with temperatures substantially higher than the indicated range and in combination with a large amount of acid catalyst (e.g. in the case of sulphuric acid the use of more than about 0.02 mole of sulphuric acid per mole of X,Y-substituted aniline reactant is to be avoided).

E: Yet another method for the preparation of the compounds of the general formula I comprises O-alkylating an anilide of the general formula IV $$Y\text{-}\underset{X}{\bigcirc}\text{-}NH\text{-}\overset{O}{\overset{\|}{C}}\text{-}A\text{-}Z$$

(IV), in which formula X, Y and A are as defined for formula I and Z is hydrogen or halogen with a strong alkylating agent to give the required compound of the general formula I, wherein $R_1$ is lower alkyl or aralkyl.

Representative strong alkylating agents are ionic alkylating agents such as those providing dialkylhalonium ions [e.g. $(R_1)_2Br^+$] and trialkyloxonium ions [e.g. $(R_1)_3O^+$] and in particular the alkyl hexafluoroantimonates [e.g. $R_1^+Sb\cdot F_6^-$]; these agents may be generically termed carbo-cationic alkylation agents. In addition to ionic agents, non-ionic alkylating agents as exemplified by the alkylfluorosulfonates may also be used. Where alkylation is effected by hexafluoroantimonates, this may be suitably carried out in sulfur dioxide by the method of Olah G. A. et al., J.A.C.S. 94, 156 (1972).

F: A further method for the preparation of the compounds of the general formula I comprises subjecting an oxime derivative of the general formula XII $$Y\text{-}\underset{X}{\bigcirc}\text{-}\overset{N-OG}{\overset{\|}{C}}\text{-}A\text{-}Z$$

(XII), in which X, Y and A are as defined for formula I, Z is hydrogen, halogen or an etherified or esterified hydroxy group and G is an acyl group, such as acetyl and preferably mesyl or tosyl, to a Beckmann-type rearrangement in the presence of an hydroxy compound of the formula $R_1OH$, wherein $R_1$ is as defined for formula I.

The rearrangement may be effected utilising the $R_1OH$ compound as solvent, or alternatively, in the presence of another inert solvent, at a temperature in the range of from about 0–150° C., preferably at around room temperature, say 10–25° C. The oxime derivative XII used as starting material may be prepared using known techniques, for example, by reacting an appropriately substituted ketone with an O-acyl derivative of hydroxylamine.

G: A further method for the preparation of the compounds of the formula I comprises treating a ketone of the general formula XIII

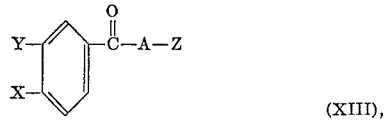

(XIII), in which X, Y and A are as defined for formula I and Z is hydrogen, halogen or an etherified or esterified hydroxy group, with hydrazoic acid under conditions substantially in accord with the Schmidt reaction and in the presence of a hydroxy compound of the formula $R_1OH$ wherein $R_1$ is as defined for formula I.

The reaction suitably may be effected in the presence of a strong acid at a temperature within the range of —20° C. to 50° C., preferably from 20° to 25° C.

The preparation of the compounds of the general formula I will now be illustrated by way of the following Examples, in which Examples 1 to 3 illustrate the preparation of starting materials and Examples 4 onwards the preparation of final products of the formula I.

EXAMPLE 1

4'-Nitro-3'-trifluoromethylisobutyranilide

To a stirred, cooled solution of 100 g. of 4-nitro-3-trifluoromethylaniline in 400 ml. of pyridine, slowly and in a dropwise fashion, add 54 g. of isobutyrylchloride and then heat the reaction mixture on a steam bath for 1.5 hours. Cool and pour the resulting mixture into ice water, filter and water-wash the crude anilide and crystallise the product of this example from benzene to obtain analytically pure material, m.p. 111.5–112.5° C.

By replacing the isobutyrylchloride reactant used in the foregoing example with an equivalent quantity of other branched-chain or cyllic acylating agents (e.g. acyl anhydrides or acyl chlorides) such as cyclobutyl carbonyl chloride, 2,3-dimethylbutyrylchloride or the like, and by following substantially the procedure set forth in this example other X,Y-disubstituted anilides of the formula IV may be obtained.

In a similar manner, by substituting the X,Y-disubstituted aniline set forth in this example with an equivalent quantity of other appropriately substituted anilines such as 3-bromo-4-nitroaniline, 3 - trifluoromethoxy-4-bromoaniline, 3-nitro-4-bromoaniline, 3,4-dinitroaniline, 3-iodo-4-nitroaniline, 3-methyl-4-nitroaniline or the like; and by following substantially the procedure set forth in this example other X,Y-disubstituted anilides of the formula IV may be obtained.

Exemplary of such X,Y-disubstituted anilides are the following:

3',4'-dinitro-2-methylbutyranilide;
4-chloro-3-trifluoromethyl-cyclobutylcarbanilide;
3-chloro-4-iodocyclopropylcarbanilide;
3'-bromo-4'-nitro-2-methylvaleranilide;
3-iodo-4-trifluoromethylisobutyranilide;
3'-methyl-4'-nitro-2-methylcaproanilide;
3'-acetyl-4'-iodo-2,3-dimethylvaleranilide;
3'-acetyl-4'-nitro-2,3-dimethylvaleranilide;
3-methoxy-4-nitroisobutyranilide;
3-ethyl-4-trifluoromethyl-isobutyranilide;
3'-propionyloxy-4-bromo-2-methylvaleranilide;
3'-propionoyloxy-4'-nitro-2-methylvaleranilide;
3'-trifluoromethylthio-4'-nitro-2,3-dimethylvaleranilide;
3-propyl-4-chloroisobutyranilide;
3-bromo-4-trifluoromethylcyclopropylcarbanilide;
3'-bromo-4'-nitro-2,3-dimethylbutyranilide;
3-nitro-4-bromoisobutyranilide;
3'-iodo-4'-chloro-2-methylbutyranilide;
4-nitrocyclopropylcarbanilide;
3'-propionyl-4'-trifluoromethyl-2,3-dimethylbutyranilide;
3'-propionyl-4'-nitro-2,3-dimethylbutyranilide;
4-trifluoromethylisobutyranilide;
3'-trifluoromethyl-4'-nitro-2-methylbutyranilide;
3-fluoro-4-nitroisobutyranilide;
3-trifluoromethyl-4-chloroisobutyranilide;
4-nitroisobutyranilide;
3'-trifluoromethyl-4'-nitro-2-ethylbutyranilide;
3-bromo-4-nitroisobutyranilide;
3'-trifluoromethyl-4'-nitro-2,3-dimethylbutyranilide;
3-trifluoromethyl-4-bromoisobutyranilide.

Where it is desired to prepare a X,Y-disubstituted anilide not specifically mentioned herein, that compound may be prepared by analogy processes known in the art.

EXAMPLE 2

N-(4-Nitro-3-trifluoromethylphenyl)isobutyrchlorimidate

To 2.7 g. of 4-nitro-3-trifluoromethyl-isobutyranilide prepared as in Example 1, in 100 cc. of toluene is added 20.8 g. of phosphorus pentachloride. The addition of phosphorus pentachloride begins a spontaneous reaction with evolution of hydrochloric acid. When the reaction subsides a clear solution is obtained. Reflux the resulting solution for 18 hours. Remove the excess toluene and phosphorus oxychloride *in vacuo*. Add hexane and filter off the unreacted starting material. Evaporate the hexane solution to obtain a brown oil which distills at 100–103°/.003 mm. mercury.

Similarly by treating the other anilides enumerated in Example 1, the corresponding N-arylhaloimidates are obtained.

EXAMPLE 3

4-Nitro-3-trifluoromethylisobutyrthioanilide

Reflux a mixture containing 16.8 g. of phosphorus sulfide and 25.5 g. of 4-nitro-3-trifluoroisobutyranilide in 100 ml. of toluene for 6.5 hours and then filter. Concentrate the filtrate and chromatograph the residue on 500 g. of silica gel, eluting with 2 liters of benzene. Concentrate the last 1.2 liters of eluate to 40 ml. and extract the concentrate with two portions of 25 ml. of 10% sodium hydroxide. Combine the basic extracts, acidify with 75 ml. of 10% sulfuric acid, and collect the analytically pure product of this example, m.p. 74–76° C.

EXAMPLE 4

Ethyl N-(4-nitro-3-trifluoromethylphenyl)-isobuyrimidate

To a stirred solution of 7.1 g. (0.24 moles) of N-(4-nitro - 3 - trifluoromethylphenyl)isobutyrchloroimidate in 20 ml. of dry ether add dropwise 0.0264 moles of sodium ethoxide in 50 ml. of dry ethanol and stir for 1.5 hours. Add water, extract with ether, wash the ether extract thoroughly with water, dry over magnesium sulfate, filter and remove the solvent to obtain the crude product of this example. Isolate analytically pure product by distillation (b.p. 90–93°/0.002 mm.), m.p. 38–39° C.

By replacing the sodium ethoxide employed in this example with appropriate amounts of salts of other hydroxy compounds of the general formula $R_1OH$, such as sodium methoxide, sodium propoxide, sodium phenoxide and the like there is obtained the correspondingly substituted imidate of this example.

In a similar manner, by replacing the N-(4-nitro-3-trifluoromethylphenyl) - isobutyrchloroimidate with other N-arylhaloimidates, such as those enumerated as obtainable by Example 2, other N-aryl-imidates within the general formula I may be obtained.

EXAMPLE 5

Ethyl N-(4-nitro-3-trifluoromethylphenyl)-isobutyrimidate

Heat a mixture of 0.5 moles of 4-nitro-3-trifluoromethyl-isobutyrthioanilide prepared as in Example 3 and 0.5 moles of ethyl chloroformate at 60° C. until the thioanilide is consumed (thin layer chromatography). Stir with ice-cold 10% alkali and extract the product of this example rapidly into ether.

EXAMPLE 6

Methyl N-(4-nitro-3-trifluoromethylphenyl)-2-hydroxyisobutyrimidate

Stir a mixture of 0.1 moles of 2-nitro-5-chlorotrifluoromethylbenzene, 0.1 moles of methyl-2-hydroxy-isobutyrimidate hydrochloride (prepared from acetone cyanohydrin and methanol in ether hydrogen chloride) and 0.22 moles of anhydrous potassium carbonate in 100 ml. of dry dimethylsulfoxide until all of the 2-nitro-5-chlorotrifluoromethylbenzene is consumed (thin layer chromatography). Quench with 300 ml. of water and extract out the product of this example with ether.

EXAMPLE 7

Ethyl N-(4-nitro-3-trifluoromethylphenyl)-isobutyrimidate

Heat a mixture of 103 g. (0.5 mole) of 4-nitro-3-trifluoromethylaniline and 95 g. (0.5 mole) of triethylorthoisobutyrate at about 150° C. for 1.5 hours and then raise the temperature to 160° C., distilling off the volatile material. Cool the residue to room temperature, extract rapidly with ether and obtain the product of this example.

EXAMPLE 8

Ethyl N-(4-nitro-3-trifluoromethylphenyl)-isobutyrimidate

To 0.1 moles of 4-nitro-3-trifluoromethylisobutyranilide at −60° C., add 0.1 moles of ethylhexafluoroantimonate in sulfur dioxide and stir at −40° C. for one hour. Quench with ice-cold 10% alkali and extract the product of this example rapidly with ether.

EXAMPLE 9

Ethyl N-(4-nitro-3-trifluoromethylphenyl)isobutyrimidate

Dissolve 0.20 moles of 4-nitro-3-trifluoromethylisobutryophenone-O-tosyloxime in 150 ml. of dry ethanol and let stand at room temperature until the starting material is consumed (thin layer chromatography). Remove the solvent *in vacuo*, neutralise with ice-cold 10% alkali and extract the product of this example rapidly with ether.

EXAMPLE 10

Ethyl N-(4-nitro-3-trifluoromethylphenyl)isobutyrimidate

Add 1 mole of 4-nitro-3-trifluoromethylisobutyrophenone in 600 ml. of a benzene solution containing 1.5 moles of hydrazoic acid, dropwise, with stirring to 250 ml. of ethanol saturated with hydrogen chloride and maintain the temperature at 20–25° C. When gas evolution ceases, remove the solvents *in vacuo* neutralise with ice-cold 10% alkali and extract the product of this example rapidly with ether.

The compounds of the general formula I exhibit anti-androgenic activity.

This illustrated by the following results obtained for ethyl N - (4-nitro-3-trifluoromethylphenyl)isobutyrimidate:

Test Method Employed

Male rats (Charles Rivers CD strain, 21–28 days old, weighnig 55–60 g.) are bilaterally castrated and drug treatment begun the following day. The rats are treated with from 5 to 50 mg./kg. (as indicated) of test drug administered orally as a suspension in an aqueous carboxymethyl cellulose (CMC) solution. Concomitantly the rats are administered 10 μg. of testosterone propionate (androgen stimulant) in sesame oil by subcutaneous (s.c.) administration. This regimen is continued for seven (7) days. Twenty-four (24) hours later the animals are sacrificed and their seminal vesicles and ventral prostates removed and weighed.

For comparative purposes two other groups of castrated rats are utilised. One group is administered testosterone propionate but no test drug. The second group (controls) is administered neither the test drug nor the testosterone propionate, but is administered only sesame oil (s.c.) and CMC.

The test results are calculated in terms of percent (percent) inhibition of weight gain of the seminal vesicles and the ventral prostate using the following expression:

$$\text{Percent inhibition of weight gain} = 100 - \left(\frac{Y}{X} \times 100\right)$$

where
X is the observed weight gain for the testosterone controls minus the observed weight gain for the sesame oil controls, and
Y is the observed weight gain for the drug-treated controls minus the observed weight gain for the sesame oil controls.

The relationship between the relative anti-androgenic activity and the determined percent inhibition of weight gain, can be given as follows:

| Activity: | Percent inhibition of weight gain |
|---|---|
| 0 (inactive) | 0–30 |
| 1 (slightly active) | 30–40 |
| 2 (moderately active) | 40–75 |
| 3 (very active) | greater than 75 |

Results

The results obtained using ethyl-N-(4-nitro-3-trifluoromethylphenyl)-isobutyrimidate in the above test are given in Table I.

TABLE I

| Dose level of drug, mg./kg. | Based on seminal vesicles | | Based on ventral prostrate | |
|---|---|---|---|---|
| | Percent inhibition of weight gain | Corresponding indicated activity | Percent inhibition of weight gain | Corresponding indicated activity |
| 5 | 29 | 0 | 1 | 0 |
| 10 | 36 | 1 | 12 | 0 |
| 15 | 59 | 2 | 28 | 0 |
| 25 | 75 | 3 | 36 | 1 |
| 50 | 92 | 4 | 82 | 4 |

In general it may be said that the compounds of the general formula I will exert an anti-androgenic response when administered within a dose range of about 5 to 250 mg. per kg. of body weight per day, depending upon the size and species of the animal and the compound administered. Accordingly, a method of inducing an anti-androgenic effect in an animal comprises administering an effective quantity of a compound of the general formula I. On the basis of their anti-androgenic activity the compounds of the general formula I are indicated as being useful in treating, alleviating and/or palliation of androgen-caused and/or androgen dependent conditions such as prostatic hyperplasia (e.g. benign prostatic hypertrophy, prostatic carcinoma), the Stein-Leventhal syndrone, idiopathic hirsutism, acne, mammary carcinoma and the like.

In those animal species afflicted with prostatic hypertrophy the frequency of the hypertrophic condition seems to increase with age and thus represents a serious problem, even among older canine household pets. In general, hormone therapy, such as for example, administration of estrogenic substances, has not proved to be a particularly desirable treatment, not only because of the undesirable side effects due to the inherent properties of the estrogens, but also because such agents have not proved to be fully efficacious in providing meaningful remissions and cures. Surgical ablation, even though effective, is also not particularly desirable for in addition to the expected 2–3% mortality rate, such non-fatal complications as epididymitis, pneumonia, pyelonephritis, secondary resection, etc. can result. Thus, the provision of a chemotherapeutic agent and treatment for prostatic hypertrophy in which the above mentioned side effects are avoided has been a goal long sought.

It is envisaged that the compounds of the general formula I may be used to produce remissions in cases of prostatic hyperplasia without the undesirable effects elicited upon the administration of estrogens or complications inherent in any surgical procedures. Depending upon the severity of the condition, it is considered that a satisfactory therapeutic response would be achieved in those mammal species having an adult body weight of approximately 70 kilogram with a dosage rate in the range of about 100 mg. to 1 gm. per day (conveniently administered in 1–4 dosage units) for the preferred active ingredients, treatment being continued until symptomatic relief is obtained as ascertained by the attending diagnostician.

On the basis of their anti-androgenic activity, the compounds of this invention may also be used as chemical castrating agents and in this context are indicated as useful in enhancing the quality of the meat of male meat-producing animals.

In this connection it has long been known that male bovine and porcine species do not produce particularly suitable meat. It is also known that the male animal grows at a faster rate, usually weighs more and produces a leaner carcass than does the corresponding female species. One attempt at converting the male into a more suitable commercial meat source has been by surgical castration (ie., removal of the androgen source). However, this method has not been completely satisfactory for it involves a time-consuming process and often leads to post-surgical problems such as infection. It is considered that administration of a therapeutically effective quantity of the compounds of the general formula I will obviate or mitigate the aforementioned undesirable meat-growth characteristics and furthermore remove or reduce the noxious odour associated with the meat of male animals. This noxious odour is particularly manifested by the pig where the meat of the male animal upon cooling emits the well-known and quite repugnant "boar-odour" rendering the meat product unpalatable. In addition to pigs, the compounds of the invention are also considered to be of use in the chemical castration of other animal species such as cattle, horses, sheep, oxen, hogs, goats and in avian species such as drakes, geese roosters and turkeys.

In effecting chemical castration in the above mentioned manner, two procedures are indicated. In the first procedure, applicable to mammals, a therapeutically effective quantity of a compound of the formula I is administered to a pregnant mammal shortly before and/or during the period of fetal genital formation. The result of this administration is that the litter produced will be devoid of males and will consist solely of females and hermaphrodites.

In the second procedure, a therapeutically effective quantity of the compound of the formula is administered to a male animal of the particular species shortly before and/or during the development of its secondary sex characteristics so as to elicit an anti-androgenic effect during and after said period.

In another of their applications, the compounds of the invention may be administered to adult male animals to reduce or obviate aggressive tendencies of the male animals of the particular species. In this connnection the compounds of the invention are indicated as being particularly useful in the treatment of valuable zoological species such as lions, tigers and elephants.

The compounds of the general formula I may be in the form of a pharmaceutical composition containing as active ingredient the said compound of the general formula I, or a pharmaceutically acceptable acid addition salt thereof, in association with a suitable carrier. In use for human or veterinary purposes, the compounds of the general formula I may suitable be administered by oral, parenteral or rectal routes. Conveniently, the compositions are in the form of a dosage unit, especially a shaped dosage unit such as a tablet, capsule, dragee or suppository. Typically, a dosage unit may contain 5 to 500 mg. of the active ingredient. Alternatively, the compositions may be formulated as preparations to be measured immediately before use, e.g. as suspensions, syrups or elixirs, and these may suitably be flavoured. For injection purposes, the composition may be in the form of a sterile pyrogen-free injectable solution or suspension supplied for example in ampoules.

Suitable carriers for solid dosage units intended for oral administration include binders such as starch, lactose and other sugars, gelatin, gums, polyethylene glycols and lubricants such as talc and magnesium stearate. Suitable carriers for use in liquid compositions include water and/or an orally acceptable oil which may be present in the composition in combination with other commonly employed additives such as buffering agents, emulsifying agents, flavourings and the like. For injection purposes, the carrier for aqueous prepartions will be a sterile pyrogen-free water and again such preparation may additionally contain commonly used additives such as buffering agents, emulsifying agents, preservatives and the like.

As previously stated, the above compositions may be applied for both human and veterinary purposes. In their veterinary applications, the compositions will also be applicable for treatment of domestic pets, such as dogs and cats.

Where it is intended to administer the compositions of the present invention to meat-producing animals, the compositions may also conveniently be administered as a feed supplement. In this instance, the feed supplement will constitute the carrier.

A representative formulation of the compounds of the general formula I will now be illustrated in the following Example A.

EXAMPLE A

Tablet Formulations

Formula A (5 mg.):  Milligrams per Tablet
  Ethyl N-(4-nitro-3-trifluoro methylphenyl)-isobutyrimidate _____ 5.0
  Starch, Food Grade _____ 5.0
  Lactose, U.S.P. (Spray Dried) _____ 89.5
  Magnesium Stearate, U.S.P. _____ 0.5
  _____
  100.0

Formula B (25 mg.):
  Ethyl N-(4-nitro - 3 - trifluoromethylphenyl)-isobutyrimidate _____ 25.0
  Starch, Food Grade _____ 10.0
  Lactose, U.S.P. (Spray Dried) _____ 164.0
  Magnesium Stearate, U.S.P. _____ 1.0
  _____
  200.0

Pass the ethyl N-(4-nitro-3-trifluoromethylphenyl)-isobutyrimidate through a high speed mill equipped with a 100 to 150 mesh screen and then blend the milled product with the starch in a suitable mixing vessel. Add an equal weight of the spray-dried lactose to the blend and mix until uniform. Combine the resultant blend with the remainder of the spray-dried lactose and again mix until uniform. Blend the magnesium stearate with a portion of this mixture, and then blend the product with the remaining mixture. Continue mixing until uniform. Compress to tablets of the desired weight (100.0 mg. for 5 mg. tablet and 200.0 mg. for 25 mg. tablet).

I claim:
1. A compound of the formula:

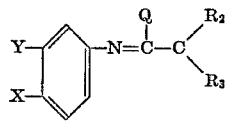

wherein Q is chloro or bromo, $R_2$ and $R_3$ each are straight or branched chain alkyl radicals having up to 5 carbon atoms or when taken together with the carbon atom to which they are attached are cycloalkyl having up to 5 carbon atoms, and X is a member of the group consisting of nitro, trifluoromethyl and halogen and Y is a member of the group consisting of hydrogen, halogen, nitro, lower alkyl, hydroxy, lower alkoxy, lower alkanoyloxy, lower alkanoyl, polyfluoroloweralkoxy, lower carbalkoxy, polyfluorolower alkyl, trifluoromethylthio, trifluoromethylsulfonyl and trifluoromethylsulfoxy.

2. A compound of claim 1 wherein Q is chloro and $R_2$ and $R_3$ are lower alkyl.

3. A compound of claim 1 wherein Q is chloro, X is nitro and Y is trifluoromethyl.

4. A compound of claim 1 wherein $R_2$ and $R_3$ are methyl, X is nitro, Y is trifluoromethyl and Q is chloro.

References Cited

Stevens et al.: J. Am. Chem. Soc., vol. 76, pp. 4398–4402 (1954).

BERNARD HELFIN, Primary Examiner

G. A. SCHWARTZ, Assistant Examiner

U.S. Cl. X.R.

260—453 R, 471 R, 479 S, 566 D; 424—298